United States Patent
Yagi (12) United States Patent (10) Patent No.: US 6,788,893 B2
(45) Date of Patent: Sep. 7, 2004

(54) MOVING MEMBER HOLDING DEVICE

(75) Inventor: Shigeki Yagi, Setagaya-ku (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 10/325,890

(22) Filed: Dec. 23, 2002

(65) Prior Publication Data

US 2003/0223741 A1 Dec. 4, 2003

(30) Foreign Application Priority Data

Dec. 25, 2001 (JP) ........................................ 2001-391629

(51) Int. Cl.⁷ .............................................. G03B 15/03
(52) U.S. Cl. ...................................... 396/177; 396/178
(58) Field of Search ................................ 396/177, 178, 396/176, 536

(56) References Cited

U.S. PATENT DOCUMENTS 5,852,752 A  * 12/1998 Nakanishi et al. .......... 396/176
6,389,233 B2 *  5/2002 Kawando ...................... 396/177

FOREIGN PATENT DOCUMENTS

JP         A 7-56226      3/1995
JP         A 10-39374     2/1998

* cited by examiner

Primary Examiner—Russell Adams
Assistant Examiner—Rochelle Blackman
(74) Attorney, Agent, or Firm—Oliff & Berridge, PLC (57) ABSTRACT

A moving member holding device that holds at a first position a moving member that makes a movement between the first position and a second position relative to a fixed member, includes: an engaging member provided at either the moving member or the fixed member and having an engaging portion; and a holding member provided at the moving member or the fixed member where the engaging member is not provided, which becomes engaged with the engaging portion of the engaging member to hold the moving member at the first position. And: a position of the engaging portion of the engaging member changes along a direction in which the moving member makes the movement as the engaging member moves; the first position at which the moving member is held is adjusted along the direction in which the moving member makes the movement as the position of the engaging portion changes; and a direction in which the engaging member moves and the direction of the movement of the moving member are different from each other.

16 Claims, 7 Drawing Sheets

(RELATED ART)

FIG. 9

(RELATED ART)

MOVING MEMBER HOLDING DEVICE

INCORPORATION BY REFERENCE

The disclosure of the following priority application is herein incorporated by reference: Japanese Patent Application No. 2001-391629 filed Dec. 25, 2001.

BACKGROUND OF THE INVENTION

1. Field of the Invention

The present invention relates to a moving member holding device and, more specifically, it relates to a moving member holding device that holds a moving member in a camera, such as an electronic flash unit which is mounted so as to be allowed to move relative to the camera main body, at a specific position.

2. Description of the Related Art

Mechanisms employed to set an electronic flash unit mounted at a camera main body in an operating state by popping it up from the storage position, i.e. the non-operating state, include, for instance, the mechanism disclosed in Japanese Laid Open Patent Publication No. H 10-39374.

Figure 8:
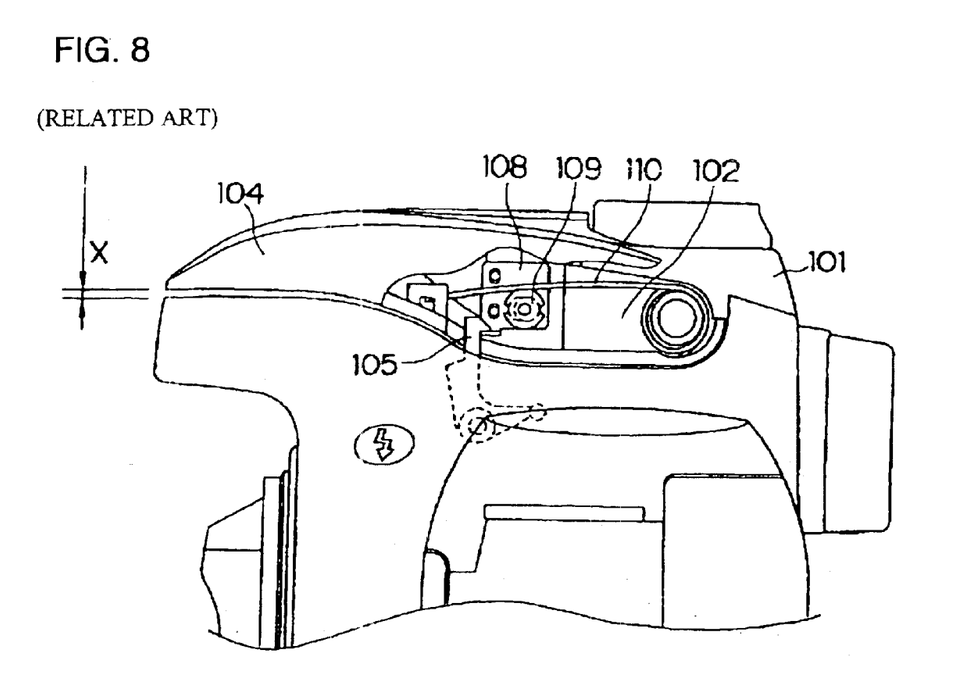
FIG. 8 is a see-through view of a pop-up mechanism used in an electronic flash unit in the related art.

FIG. 8 is a see-through view of a pop-up mechanism for an electronic flash unit utilized in the related art. A force is applied to the an electronic flash case 102 along the direction in which it is caused to rotate from the storage state to the operating state by a force-applying spring 110. In order to sustain the storage state against the force thus applied, a holding mechanism which includes a holding member 105 and an engaging member 108 is provided. By releasing the engagement between the holding member 105 and the engaging member 108 with a hold-release mechanism (not shown), the electronic flash unit can be popped up into the operating state.

Such a mechanism adopted in the related art poses a problem in that irregular mounting of mechanism parts and dimensional errors in various parts result in inconsistency in the clearance X between the front end of the electronic flash case 102 and the camera main body 101 in the storage state shown in FIG. 8 among individual cameras.

Accordingly, the mechanism in the related art disclosed in the publication includes a mechanism which adjusts the position at which the camera main body 101 and the electronic flash case 102 become engaged with each other.

Figure 9:
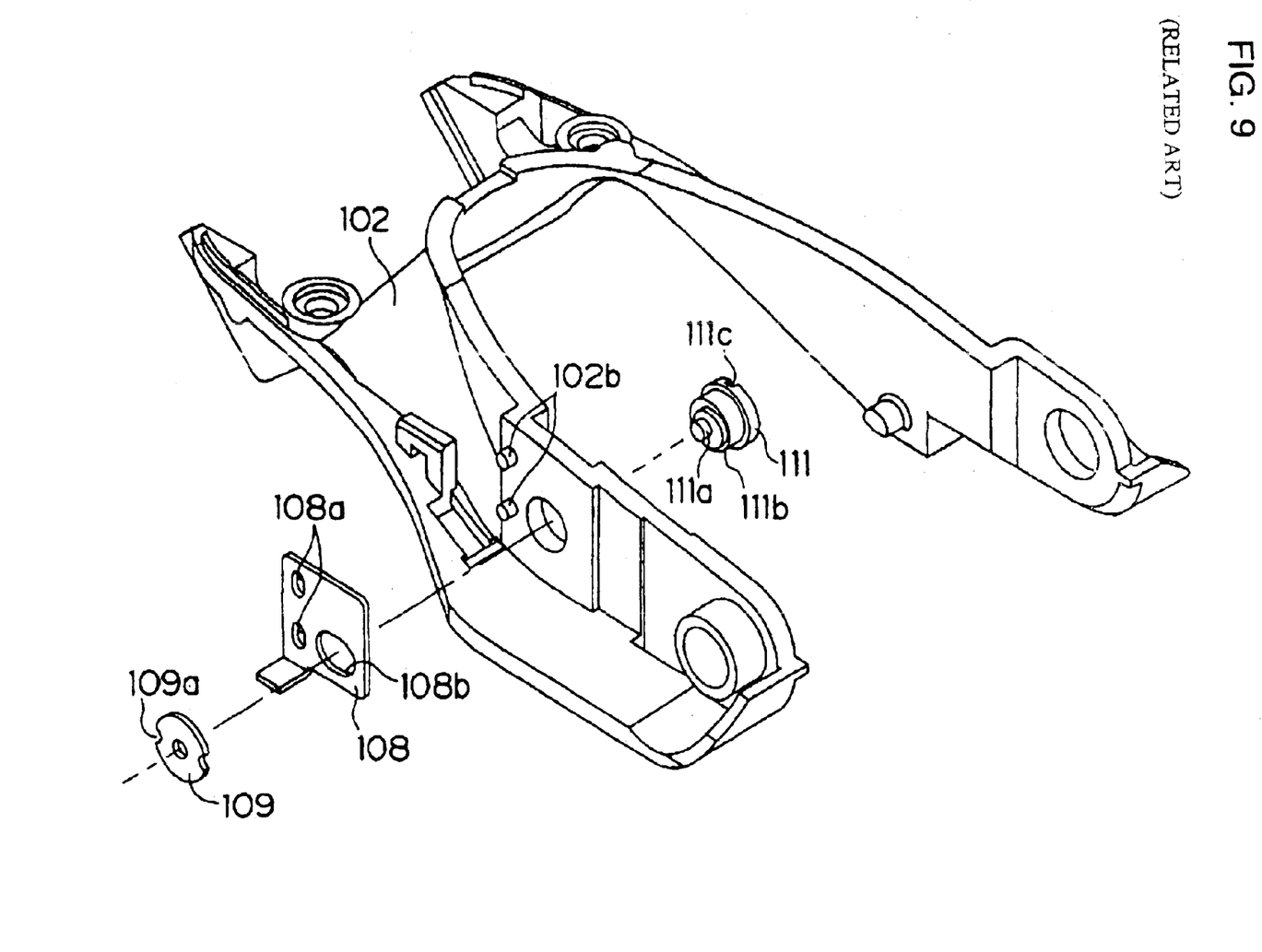
FIG. 9 is an exploded perspective of the adjustment mechanism in the camera shown in FIG. 8.

FIG. 9 presents an exploded perspective of the adjustment mechanism unit in the camera shown in FIG. 8. A rotating operational shaft 111 having an eccentric cam 111b is joined through riveting with an operating member 109 so as to clamp the engaging member 108 and the electronic flash case 102 between them. The height at which the engaging member 108 is mounted at the electronic flash case 102 can be varied by rotating the rotating operational shaft 111 or the operating member 109. In this adjustment mechanism in the related art, the engaging member 108 is held at the adjusted height through the frictional forces generated at the contact surfaces where the engaging member 108 and the electronic flash case 102 come into contact with each other and the contact surfaces where the engaging member 108 and the operating member 109 come into contact with each other.

However, the mechanism that adjusts the height at which the electronic flash case 102 becomes engaged through a rotational operation of the rotating operational shaft 111 and does not include a system for preventing the rotation of the rotating operational shaft 111, and thus, if the rotating operational shaft 111 is allowed to rotate with the wrong timing for any reason, the adjusted height changes and the engaging member 108 cannot be held at the correct adjusted height.

In particular, since the direction along which the electronic flash case 102 is opened/closed and the direction along which the engaging member 108 is allowed to move in the adjustment mechanism match in the mechanism described above, a load is applied to the engaging member 108 along the direction in which it moves when the electronic flash case 102 is opened/closed due to the mechanical shock generated at the electronic flash unit along the direction in which the case is opened/closed. In addition, if the user of the camera inadvertently pulls up the electronic flash case 2 together with an electronic flash cover 104 along the direction (opening direction) in which the electronic flash unit is set in the operating state from the storage state, too, a load is applied to the engaging member 108 along the direction in which the electronic flash case is moved.

If a load applied to the engaging member 108 along its moving direction matches and exceeds the level of the frictional forces occurring at the contact surface of the engaging member 108 and the electronic flash case 102 and at the contact surface of the engaging member 108 and the operating member 109, the adjustment position of the engaging member 108 changes to form a larger clearance and the like.

While this problem may be addressed by, for instance, providing a rotation-preventing mechanism for preventing the rotation of the rotating operational shaft 111 attributable to an external force, the presence of such an additional mechanism requires more space, which is becoming more difficult to achieve in conjunction with an increasingly small electronic flash case, the miniaturization of which has been aggressively pursued together with the miniaturization of the camera main body in recent years. There are added problems in that the more complicated structure adopted in the mechanism requires a more complicated assembly process and in that adopting such a complicated mechanism leads to an increase in the production cost.

SUMMARY OF THE INVENTION

The present invention provides a moving member holding device that does not allow any external force to change the adjustment position once the engaging position has been adjusted and does not require a large number of components. Preferably it provides a holding device that holds a moving member in a camera.

A moving member holding device according to the present invention that holds at a first position a moving member that makes a movement between the first position and a second position relative to a fixed member, comprises: an engaging member provided at either the moving member or the fixed member and having an engaging portion; and a holding member provided at the moving member or the fixed member where the engaging member is not provided, which becomes engaged with the engaging portion of the engaging member to hold the moving member at the first position. And: a position of the engaging portion of the engaging member changes along a direction in which the moving member makes the movement as the engaging member moves; the first position at which the moving member is held is adjusted along the direction in which the moving member makes the movement as the position of the engaging portion changes; and a direction in which the engaging member moves and the direction of the movement of the moving member are different from each other.

In this moving member holding device, it is preferred that the direction in which the engaging member moves and the direction of the movement of the moving member are different from each other so that a force imparted to the engaging member along the direction of the movement of the moving member does not substantially act in the direction of movement of the engaging member.

Also, it is preferred that: the engaging member changes the position of the engaging portion by rotating around a rotational axis; and a direction along which the rotational axis of the engaging member extends and the direction of the movement of the moving member substantially match each other.

Also, it is preferred that: the engaging member changes the position of the engaging portion by making a parallel movement; and the direction of the parallel movement of the engaging member and the direction of the movement of the moving member are substantially perpendicular to each other.

Also, it is preferred that: the moving member is mounted with a specific device; the first position is a position at which the specific device is stored; and the second position is a position at which the specific device is operated.

Also, it is preferred that: there is further provided a force-applying member that applies a force to the moving member toward the second position; and the holding member holds the moving member at the first position against the force applied by the forced-applying member.

Also, it is preferred that: the engaging portion includes a plurality of engaging surfaces formed at positions varying along the direction of the movement of the moving member.

Also, it is preferred that: the engaging portion includes a sloping surface whose position changes along the direction of the movement of the moving member.

Also, it is preferred that: the engaging member is a member screwed into the moving member or the fixed member; and a position of the engaging portion of the engaging member is varied along the direction of the movement of the moving member by adjusting a screwing height of the engaging member.

Also, it is preferred that: there is further provided a movement-regulating member that regulates a movement of the engaging member so that the engaging member is not allowed to move unless a force exceeding a predetermined level is applied. In this case, it is preferred that: the movement-regulating member holds the engaging member so as to allow the engaging member to move relative to the moving member or the fixed member.

A moving member holding device according to the present invention that holds at a storage position a moving member which makes a movement between the storage position and an operating position relative to a fixed member, comprises: a force-applying member that applies a force to the moving member toward the operating position; an engaging member provided at either the moving member or the fixed member and having an engaging portion; and a holding member provided at either the moving member or the fixed member where the engaging member is not provided, which becomes engaged with the engaging portion of the engaging member to hold the moving member at the storage position against the force imparted by the forced-applying member. And: the engaging portion includes a plurality of engaging surfaces formed at positions varying along a direction of the movement of the moving member; the engaging member varies a position at which the engaging portion becomes engaged with the holding member by selecting one of the plurality of engaging surfaces through a rotational movement around a rotational axis thereof; the storage position at which the moving member is held is adjusted along the direction of the movement of the moving member by changing the position of the engaging portion; and a direction along which the rotational axis of the engaging member extends and the direction of the movement of the moving member substantially match each other.

A moving member holding device in a camera according to the present invention that holds at a first position a moving member which makes a movement between the first position and a second position relative to a fixed member, comprises: an engaging member provided at either the moving member or the fixed member and having an engaging portion; and a holding member provided at either the moving member or the fixed member where the engaging member is not provided, which becomes engaged with the engaging portion of the engaging member to hold the moving member at the first position. And: a position of the engaging portion of the engaging member changes as the engaging member moves; the first position at which the moving member is held is adjusted through a change of the position of the engaging portion; and a direction in which the engaging member moves and a direction of the movement of the moving member are different from each other.

In this moving member holding device in a camera, it is preferred that: the fixed member is a camera main body; the moving member is mounted with a flash light emitting unit that illuminates a subject; the first position is a position at which the flash light emitting unit is stored in the camera main body; and the second position is a position at which the flash light emitting unit is popped up and operated. In this case, it is preferred that: the engaging member is provided at the moving member; and the engaging member becomes exposed so that the engaging member can be moved from an outside to enable an adjustment of the first position when the moving member is popped up to the second position.

Also, it is preferred that: the engaging member is provided either at the moving member or the fixed member so that the engaging member can be moved for an adjustment of the first position from an outside even when a camera manufacturing process is completed.

DESCRIPTION OF THE PREFERRED EMBODIMENT

Figure 1:
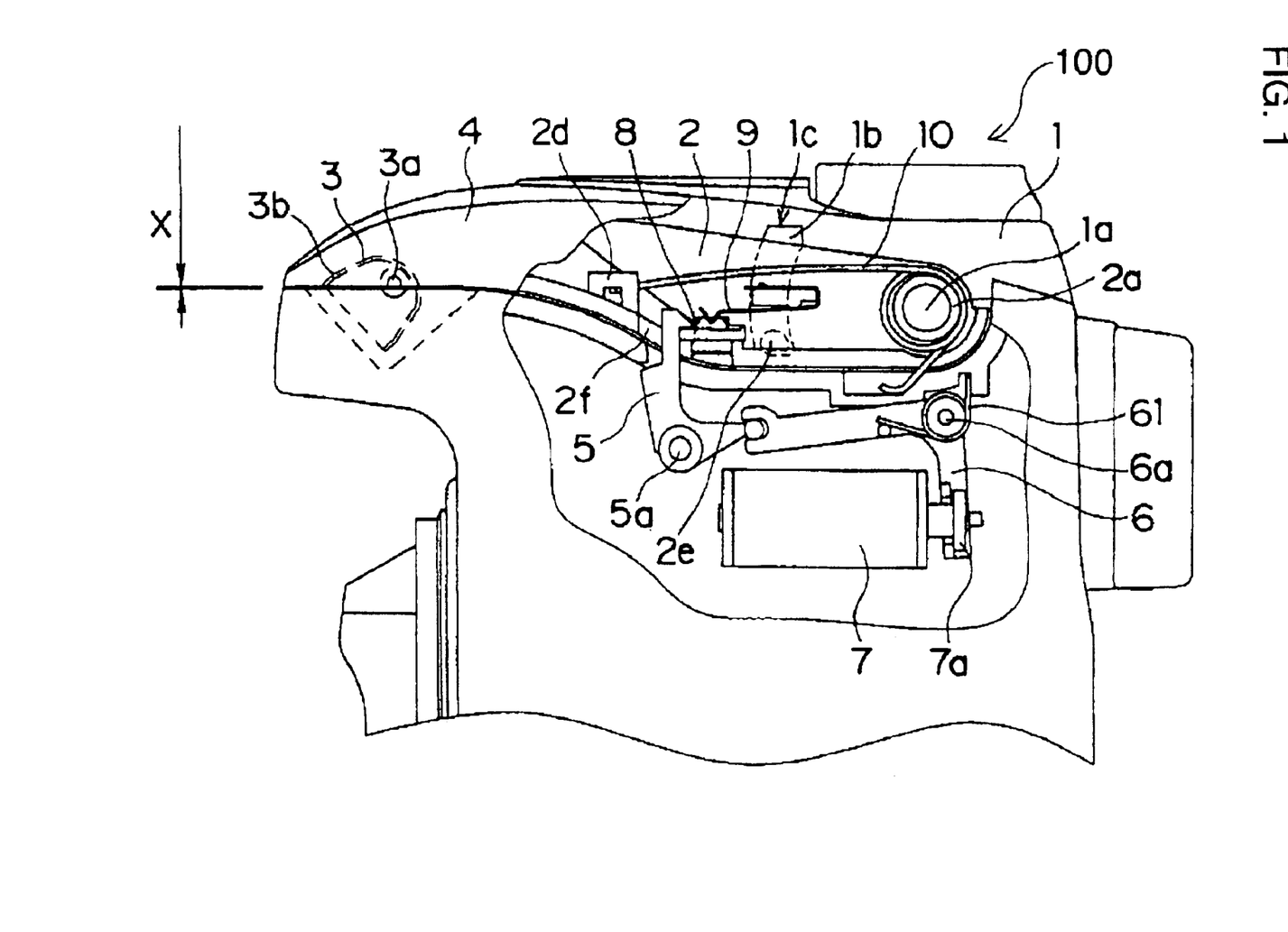
FIG. 1 is a see-through view provided to illustrate an embodiment of the camera moving member holding device according to the present invention.
Figure 2:
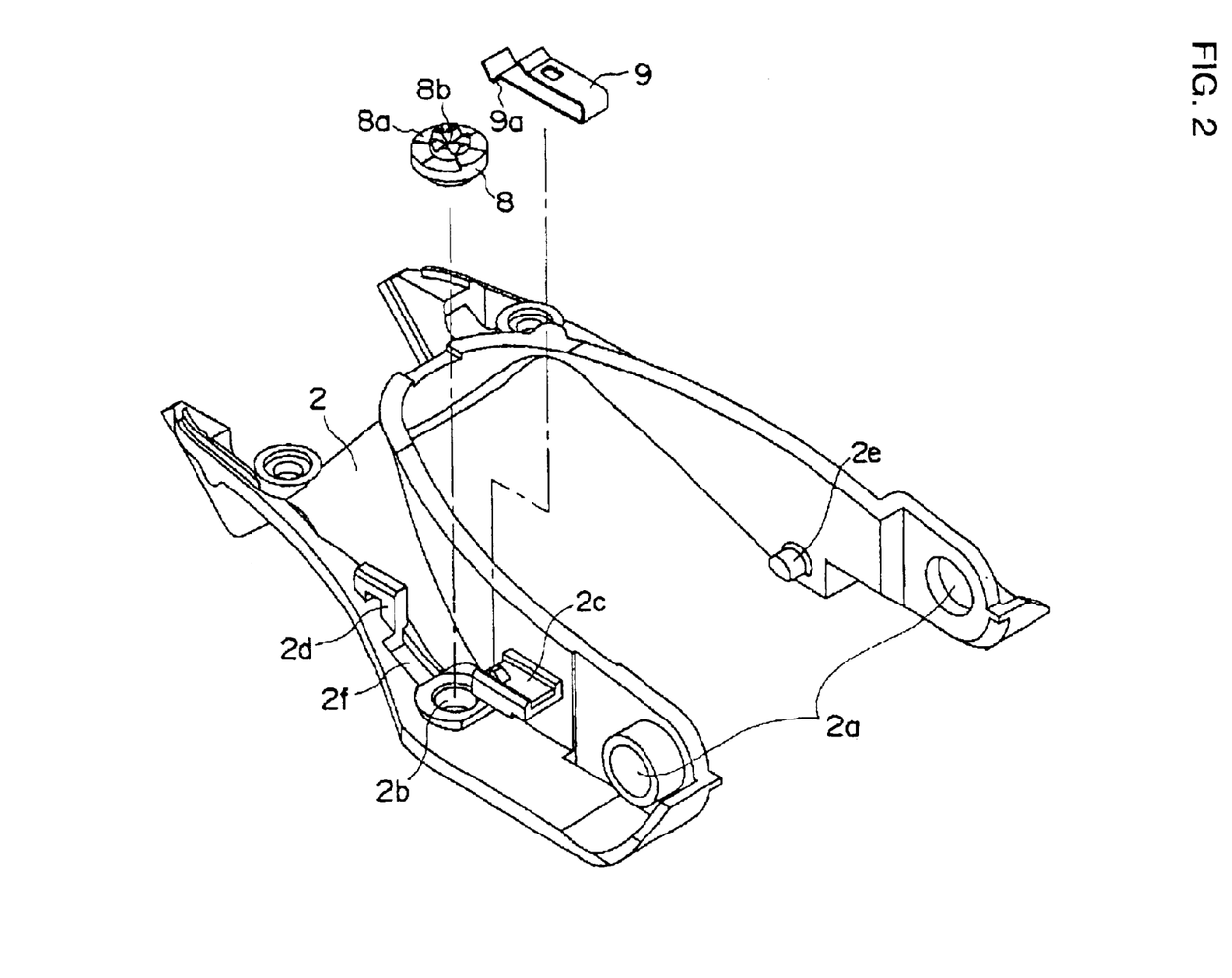
FIG. 2 is an exploded perspective of an essential portion of the camera moving member holding device achieved in the embodiment.

The following is an explanation of an embodiment of the present invention, given in reference to the drawings and the like. FIG. 1 is a see-through view of an embodiment of the moving member holding device in a camera 100 achieved in the present invention. FIG. 2 is an exploded perspective of an essential portion of the camera moving member holding device in the embodiment.

The camera 100 achieved in the embodiment includes a camera main body 1, an electronic flash case 2, a light emitting unit 3, an electronic flash cover 4, a holding member 5, a link member 6, an actuator 7, an engaging member 8, a click spring 9, a force-applying spring 10 and the like.

The camera main body 1 constitutes a photographing apparatus which may be either a silver halide type camera or a digital still camera, and the embodiment is achieved by adopting the present invention in a camera that uses a single lens reflex viewfinder.

The electronic flash case 2 is a moving member constituting a base of a pop-up mechanism for the electronic flash unit that pops up the light emitting unit 3 from the storage position to the operating position or sets the light emitting unit 3 back into the storage position from the operating position, and with its shaft hole cylindrical portion 2a fitted with a shaft portion 1a of the camera main body 1, the electronic flash case 2 is held so as to be allowed to rotate between the storage position and the operating position around the cylindrical shaft hole portion 2a. A force is applied to the electronic flash case 2 toward the operating position by the force-applying spring 10 mounted at the shaft hole cylindrical portion 2a, and its rotation is regulated as a stopper portion 2e of the electronic flash case 2 passing through a groove portion 1b of the camera main body 1 comes into contact with a rotation-regulating portion 1c. The position at which the stopper portion 2e comes into contact with the rotation-regulating portion 1c is the operating position (operating state) of the electronic flash unit.

The light emitting unit 3, having an electrical discharge tube 3a, a reflection plate 3b and the like and constituting a light emitting unit of the electronic flash unit that emits flash light, is secured to the electronic flash case 2.

The electronic flash cover 4 is an external component which covers and shields the light emitting unit 3, the engaging member 8, the click spring 9 and the like provided at the electronic flash case 2.

The holding member 5, which is provided at the camera main body 1 and is made to engage with an engaging portion 8a of the engaging member 8 through a hole 2f of the electronic flash case 2, is a member that holds the electronic flash case 2 at the storage position against the force applied by the force-applying spring 10. The holding member 5 is held so as to be allowed to rotate freely around a rotating shaft portion 5a and performs a hold release operation as a drive force is imparted from the actuator 7 via the link member 6.

The link member 6 is held at the camera main body 1 so as to be allowed to rotate freely around a rotating shaft portion 6a. A force is applied to the link member 6 by a force-applying spring 61 along a counterclockwise direction in FIG. 1 to retain the holding member 5 at the holding position shown in FIG. 1.

The actuator 7 is a solenoid plunger whose movable portion 7a is caused to move into the actuator main unit from the state shown in FIG. 1 when power is supplied to the actuator 7 from a control unit (not shown). The power is supplied to the actuator 7 to engage it in operation to release the hold by the holding member 5.

The hold release operation for releasing the engagement between the holding member 5 and the engaging member 8 when the electronic flash unit is in the storage state is executed by a hold release mechanism constituted of the holding member 5, the link member 6, the force-applying 61 and the actuator 7. During the hold release operation, the holding member 5 is caused to rotate via the link member 6 by activating the actuator 7 to release the hold.

The engaging member 8 is held rotatably at a fitting hole 2b formed at the electronic flash case 2.

Figure 3A:
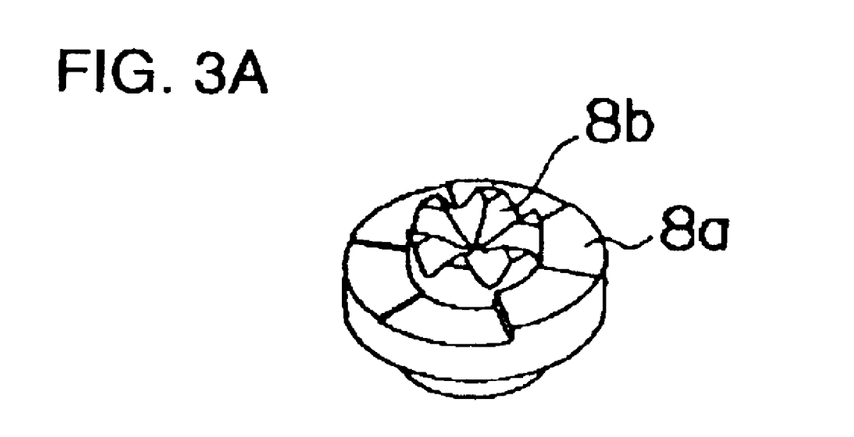
FIGS. 3A and 3B are perspectives of the engaging member 8.
Figure 3B:
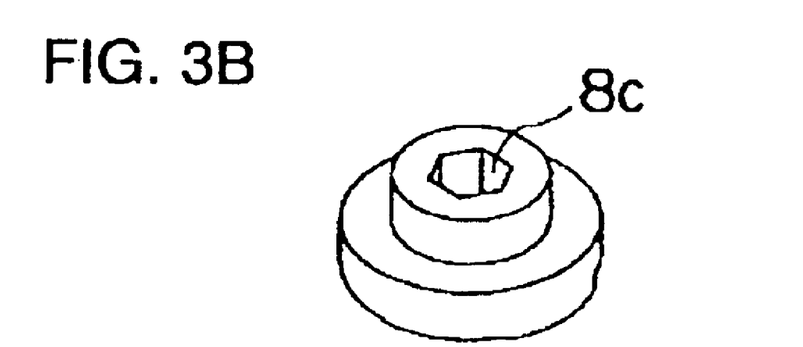

FIG. 3 presents perspectives of the engaging member 8. FIG. 3A shows the engaging member 8 viewed from the side where it becomes engaged with the holding member 5, whereas FIG. 3B shows the engaging member 8 viewed from the opposite side (from the lower side).

The engaging member 8 includes a plurality of engaging portions (engaging surfaces) 8a which are formed as surfaces perpendicular to the rotational axis of the engaging member 8 on the circumference of the engaging member 8 in stages with varying heights and groove portions 8b each corresponding to one of the engaging portions 8a. In addition, on the opposite side, where no engaging portions 8a are provided, a tool insertion hole 8c is formed.

The click spring 9 is a movement-regulating member which is secured at a fixed portion 2c of the electronic flash case 2 and regulates the rotational movement of the engaging member 8. As a V-shaped portion 9a of the click spring 9 drops into a groove portion 8b of the engaging member 8, the rotation of the engaging member 8 becomes regulated by the click spring 9. Subsequently, unless a force exceeding a predetermined level is applied, the movement of the holding member is disallowed.

The click spring 9 also movably holds the engaging member 8 by pressing the engaging member 8.

The force-applying spring 10 is a force-applying member that applies a force to the electronic flash case 2 toward the operating position. With its coil portion mounted at the cylindrical shaft hole portion 2a and one of its arms hooked at a spring hooking portion 2d of the electronic flash case 2, the force-applying spring 10 applies a force to the electronic flash case 2.

Now, an engaging position adjustment mechanism provided at the pop-up mechanism of the electronic flash unit in the embodiment is explained.

As explained earlier in reference to the related art, this type of holding mechanism requires an engaging position adjustment mechanism.

The requirements that the adjustment mechanism needs to satisfy are listed below.
(1) The adjustment work can be executed with ease by, for instance, using an operating tool.
(2) The adjustment can be easily performed from the outside even in the state in which the electronic flash cover 4 is fitted on the electronic flash case 2.
(3) Since its function is a sub-function of the main function, i.e. holding the electronic flash unit, it should occupy minimum space and should be achieved at minimum cost.
(4) The adjustment operation unit should not be exposed to the outside.
(5) The adjustment position should not change even when an external force is applied after the adjustment work is completed.

In the embodiment, the requirement (5) as well as the requirements (1)–(4) are satisfied by utilizing the engaging member 8.

In order to satisfy the requirement (5) above, the engaging portions 8a of the engaging member 8 must satisfy at least one of the following requirements.

(a) The engaging portions are formed so that an adjusting movement is enabled to allow their positions relative to the holding member to vary and so that the level of the force applied along the adjusting movement direction, attributable to the force imparted by the holding member to the engaging portions in the storage state, is substantially 0.

(b) The engaging portions are formed so that they are able to move for purposes of adjustment to allow their positions relative to the holding member to vary and so that the adjusting movement is made substantially perpendicular to the direction in which the force is imparted by the holding member to the engaging portions in the storage state. The movement, as referred to in this context, includes a parallel (sliding) movement and a rotational movement.

(c) The engaging portions are formed so that an adjusting movement is enabled to allow their positions relative to the holding member to vary and so that a force is applied to achieve the adjusting movement along a direction which is substantially perpendicular to the direction in which the force is imparted by the holding member to the engaging portions in the storage state.

In the embodiment, the requirement (a) is satisfied by forming the engaging portions 8a as surfaces substantially perpendicular to the rotational axis of the engaging member 8, thereby ensuring that no component of the force imparted by the holding member 5 acts along the direction in which the engaging member 8 is caused to rotate. In addition, the engaging portions 8a formed in this manner in the embodiment also satisfy the requirements (b) and (c).

In the embodiment, the groove portions 8b are provided each in correspondence to one of the engaging portions 8a, and as the V-shaped portion 9a of the click spring 9 drops into a groove portion 8b, the rotation of the engaging member 8 becomes regulated, which makes it possible to hold the adjustment position with an even higher degree of reliability.

In addition, the tool insertion hole 8c formed at the engaging member 8 is exposed to the outside of the electronic flash case 2 through the through hole 2b while the engaging member 8 is held by the electronic flash case 2. Since the rotating operation of the engaging member 8 for selecting (adjusting) the engaging portion height is performed with a tool inserted at the tool insertion hole 8c from the outside of the electronic flash case 2, an easy operation is enabled even when the electronic flash cover 4 is mounted at the electronic flash case 2.

Figure 4:
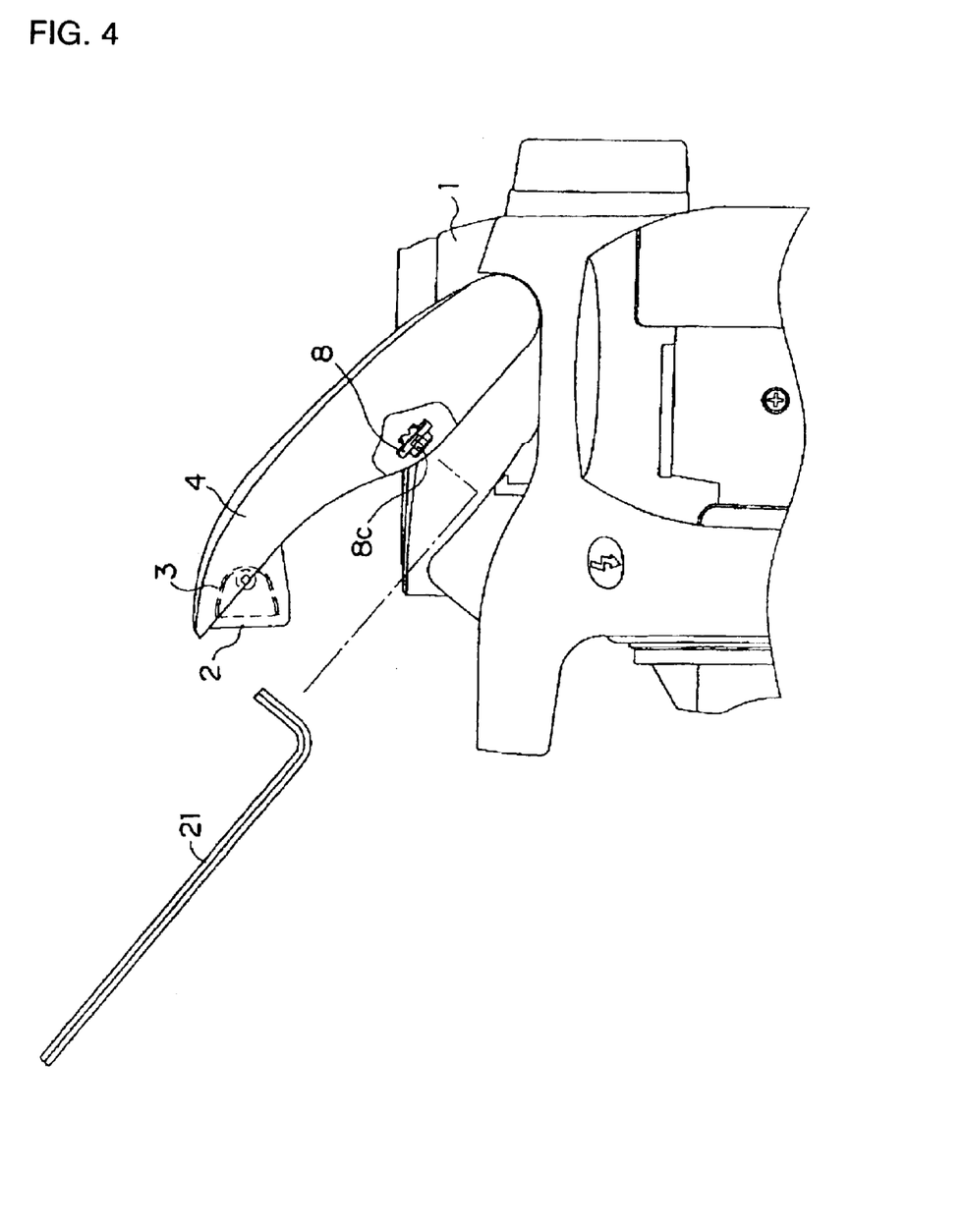
FIG. 4 illustrates the adjustment method adopted in the adjustment mechanism in the embodiment.

FIG. 4 illustrates the adjustment method adopted at the adjustment mechanism in the embodiment. In the embodiment, the tool insertion hole 8c is formed as a hexagon socket, and an adjustment operation can be performed even when the electronic flash unit is in the operating state by inserting a hexagon wrench 21 between the camera body and the electronic flash case and further inserting the hexagon wrench 21 into the tool insertion hole 8c of the engaging member 8 through the through hole 2b from the bottom surface of the electronic flash case. Thus, since the adjustment operation unit is provided at the bottom surface of the electronic flash case 2, the adjustment operation unit is not exposed at the exterior when the electronic flash unit is not in the operating state. In addition, since the adjustment mechanism is constituted of only two parts, easy assembly is assured. Furthermore, the adjustment can be performed even after the camera assembly is completed at the factory.

It is to be noted that by applying a force (rotational torque) exceeding a specific level to the engaging member 8 with the hexagon wrench 21, the engaging member 8 is allowed to rotate in spite of the restriction on the movement of the engaging member 8 imposed by the click spring 9, and thus, the engaging member 8 stops at a specific position every time the click spring 9 is caught in a groove portion 8b (over a predetermined interval) and is not allowed to stop at any position in between.

In the embodiment, in which the plurality of engaging portions 8a corresponding to the various adjustment positions are formed in stages (in a stairs-like or steps-like shape) as surfaces perpendicular to the rotational axis of the engaging member 8, a force that would rotate the engaging member 8 is not generated by the force imparted by the holding member 5 to the engaging member 8. Thus, even if the electronic flash case 2 or the like is forcibly pulled from the storage position toward the operating position, the adjustment position does not become shifted. Moreover, since the rotation is regulated by causing the click spring 9 to be held at a groove portion 8b of the engaging member 8, the engaging member is not allowed to rotate. Consequently, the adjustment position does not become shifted even if a continuous vibration occurs.

(Variations)

The present invention is not limited to the example presented in the embodiment explained above, and it allows for a number of variations and modifications without departing from the uniform scope of the present invention.

Figure 5:
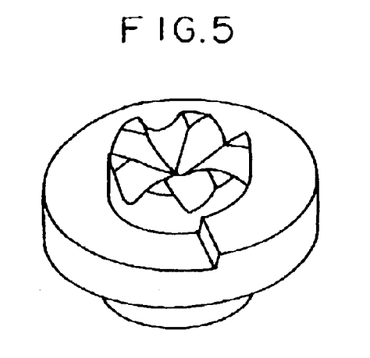
FIG. 5 is a perspective of another engaging member.

For instance, while the engaging portions 8a are formed in stages as a plurality of flat surfaces perpendicular to the rotational axis of the engaging member 8 corresponding to various adjustment positions in the embodiment, the present invention is not necessarily limited to this example. For instance, an engaging portion may be formed as a gently sloping surface that allows the adjustment position to gradually change in correspondence to the rotational position (see FIG. 5). While a slight force corresponding to the component in the direction in which the engaging member is rotated is generated by the force imparted by the holding member in this case, the surface is only required to have enough slope to prevent the engaging member from rotating due to the friction of the engaging member and the electronic flash case and, in addition, a movement-regulating member such the click spring 9 may be provided in combination.

Figure 6:
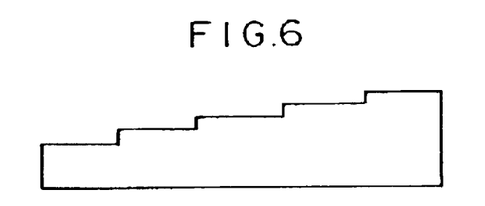
FIG. 6 is a perspective of another engaging member.
Figure 7:
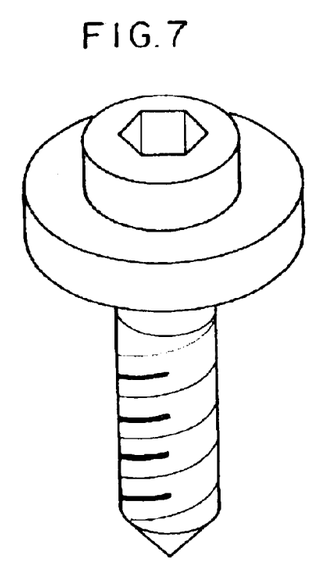
FIG. 7 is a perspective of another engaging member.

While the engaging member in the embodiment makes a rotational movement, the present invention is not necessarily limited to this example. For instance, the engaging member may make a sliding movement (parallel movement) (see FIG. 6), or it may be formed as a member which is screwed into the electronic flash case so that the position of the engaging portion relative to the holding member along the holding direction is a varied by changing the screwing height to which the engaging member is screwed (see FIG. 7).

Furthermore, while the present invention is adopted in the pop-up mechanism for the electronic flash unit in the embodiment, the present invention does not need to be limited to this example. For instance, it may be adopted to hold a lens barrier for a collapsible lens in a compact camera or it may be adopted to hold a pop-up type electronic viewfinder. Namely, it can be adopted to hold various moving members in a camera. Moreover, it may be adopted in apparatuses other than cameras.

While an explanation is given above in reference to the embodiment on an example in which the engaging member is mounted at a moving member, i.e., the electronic flash case, and the holding member is mounted at the fixed member, i.e., the camera main body, the present invention is not limited to this example. The engaging member may be mounted at the fixed member, i.e., the camera main body, and the holding member may be mounted at the moving member, i.e., the electronic flash case, instead.

The camera moving member holding device explained above achieves the following advantages. Since the positions of the engaging portions relative to the holding member along the holding direction change substantially perpendicular to a direction substantially matching the direction in which the rotational axis of the engaging member extends or to the plane over which the sliding movement is made, no force is generated along the direction in which the engaging member would be caused to move by the force imparted by the holding member.

Since the engaging portions are formed at least either as a plurality of engaging portions constituted of surfaces substantially perpendicular to the rotational axis or surfaces substantially parallel to the direction of the sliding movement, corresponding to different positions along the holding direction, or as a sloping surface formed to allow the engaging member to be held at varying positions relative to the holding member along the holding direction, the engaging portion can be formed in a simple shape and, at the same time, any movement of the engaging member caused by the force imparted by the holding member can be prevented.

Since the position of the engaging member, which is screwed into a moving member or a fixed member, along the direction in which the engaging member is held relative to the holding member is varied by adjusting the screwing height to which the engaging member is screwed, the engaging portion can be formed in a simple shape and, at the same time, the movement of the engaging member caused by the force imparted by the holding member can be prevented.

Since the moving member holding device includes a movement-regulating member that restricts the movement of the engaging member to ensure that the holding member is not allowed to move unless a force exceeding a predetermined level is applied, the movement of the engaging member can be prevented with an even higher degree of reliability.

Since the movement-regulating member holds the engaging member so as to allow the engaging member to move relative to a moving member or a fixed member, the number of required parts can be reduced and easy assembly is assured as well.

Since the flash light emitting unit that illuminates the subject by emitting flash light is provided at the moving member and the engaging member is provided at the moving member so as to enable an adjusting movement from the outside even after the camera manufacturing process is completed, the storage position of the electronic flash unit can be easily and reliably adjusted. Furthermore, once the adjustment is performed, the adjusted state can be maintained without allowing the user to inadvertently shift the adjustment position.

The above described embodiments are examples, and the various modifications can be made without departing from the spirit and scope of the invention.

What is claimed is:

1. A moving member holding device that holds at a first position a moving member that makes a movement between the first position and a second position relative to a fixed member, comprising:
    an engaging member provided at one of the moving member and the fixed member and having an engaging portion; and
    a holding member provided at another one of the moving member and the fixed member where the engaging member is not provided, which holds the moving member at the first position by being engaged with the engaging portion of the engaging member, wherein:
    a position of the engaging portion of the engaging member changes along a direction in which the moving member makes the movement between the first position and the second position as the engaging member moves for adjustment;
    the first position at which the moving member is held is adjusted to move along the direction in which the moving member makes the movement between the first position and the second position as the position of the engaging portion changes; and
    a direction in which the engaging member moves for adjustment and the direction of the movement of the moving member are different from each other.

2. A moving member holding device according to claim 1, wherein:
    the direction in which the engaging member moves and the direction of the movement of the moving member are different from each other so that a force imparted to the engaging member along the direction of the movement of the moving member does not substantially act in the direction of movement of the engaging member.

3. A moving member holding device according to claim 1, wherein:
    the engaging member changes the position of the engaging portion by rotating around a rotational axis; and
    a direction along which the rotational axis of the engaging member extends and the direction of the movement of the moving member substantially match each other.

4. A moving member holding device according to claim 1, wherein:
    the engaging member changes the position of the engaging portion by making a sliding movement in a linear direction.

5. A moving member holding device according to claim 1, wherein:
    the moving member is mounted with a specific device;
    the first position is a position at which the specific device is stored; and
    the second position is a position at which the specific device is operated.

6. A moving member holding device according to claim 1, further comprising:
    a force-applying member that applies a force to the moving member toward the second position; and
    the holding member holds the moving member at the first position against the force applied by the forced-applying member.

7. A moving member holding device according to claim 1, wherein:
    the engaging portion includes a plurality of engaging surfaces formed at positions varying along the direction of the movement of the moving member.

8. A moving member holding device according to claim 1, wherein:
    the engaging portion includes a sloping surface whose position changes along the direction of the movement of the moving member.

9. A moving member holding device according to claim 1, wherein:
    the engaging member is a member screwed into the moving member or the fixed member; and a position of the engaging portion of the engaging member is varied along the direction of the movement of the moving member by adjusting a screwing height of the engaging member.

10. A moving member holding device according to claim 1, further comprising:

a movement-regulating member that regulates a movement of the engaging member so that the engaging member is not allowed to move unless a force exceeding a predetermined level is applied.

11. A moving member holding device according to claim 10, wherein:

the movement-regulating member holds the engaging member so as to allow the engaging member to move relative to the moving member or the fixed member.

12. A moving member holding device that holds at a storage position a moving member which makes a movement between the storage position and an operating position relative to a fixed member, comprising:

a force-applying member that applies a force to the moving member toward the operating position;

an engaging member provided at one of the moving member and the fixed member and having an engaging portion; and a holding member provided at another one of the moving member and the fixed member where the engaging member is not provided, which holds the moving member at the storage position against the force imparted by the forced-applying member by being engaged with the engaging portion of the engaging member, wherein:

the engaging portion includes a plurality of engaging surfaces formed at positions varying along a direction of the movement of the moving member between the storage position and the operating position;

the engaging member varies a position at which the engaging portion becomes engaged with the holding member by selecting one of the plurality of engaging surfaces through a rotational movement around a rotational axis thereof;

the storage position at which the moving member is held is adjusted to move along the direction of the movement of the moving member between the storage position and the operating position by changing the position of the engaging portion; and a direction along which the rotational axis of the engaging member extends and the direction of the movement of the moving member substantially match each other.

13. A moving member holding device in a camera that holds at a first position a moving member which makes a movement between the first position and a second position relative to a fixed member, comprising:

an engaging member provided at one of the moving member and the fixed member and having an engaging portion; and a holding member provided at another one of the moving member and the fixed member where the engaging member is not provided, which holds the moving member at the first position by being engaged with the engaging portion of the engaging member, wherein:

a position of the engaging portion of the engaging member changes as the engaging member moves for adjustment;

the first position at which the moving member is held is adjusted to move through a change of the position of the engaging portion; and a direction in which the engaging member moves for adjustment and a direction of the movement of the moving member are different from each other.

14. A moving member holding device in a camera according to claim 13, wherein:

the fixed member is a camera main body;

the moving member is mounted with a flash light emitting unit that illuminates a subject;

the first position is a position at which the flash light emitting unit is stored in the camera main body; and the second position is a position at which the flash light emitting unit is popped up and operated.

15. A moving member holding device in a camera according to claim 13, wherein:

the engaging member is provided at the one of the moving member and the fixed member so that the engaging member can be moved for an adjustment of the first position from an outside even when a camera manufacturing process is completed.

16. A moving member holding device in a camera according to claim 14, wherein:

the engaging member is provided at the moving member; and the engaging member becomes exposed so that the engaging member can be moved from an outside to enable an adjustment of the first position when the moving member is popped up to the second position.

* * * * *